No. 850,052. PATENTED APR. 9, 1907.
M. A. REARE.
CHALK LINE HOLDER.
APPLICATION FILED JULY 25, 1906.
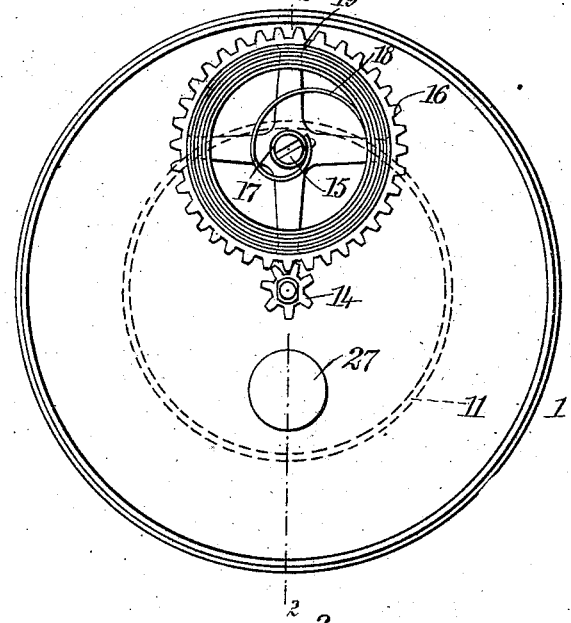
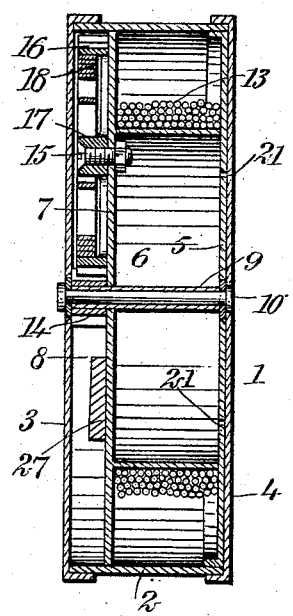
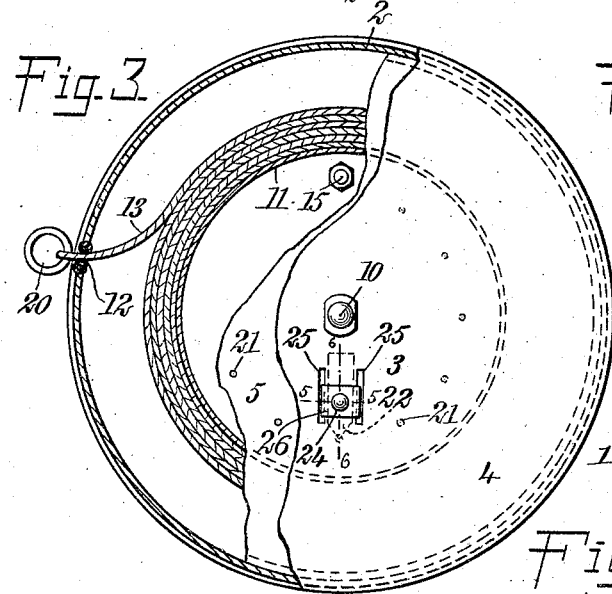
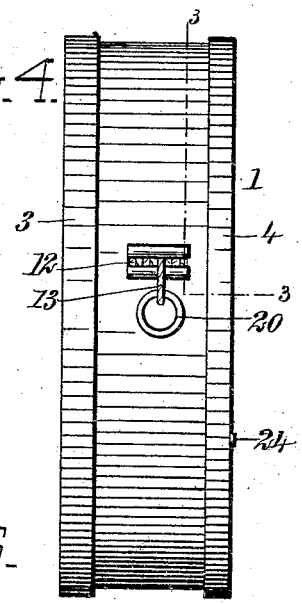
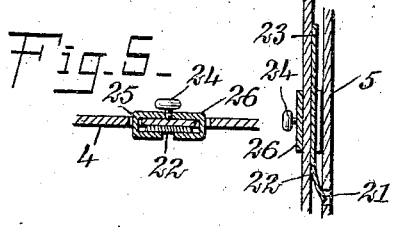
WITNESSES
INVENTOR
Morley A. Reare
BY
ATTORNEYS

UNITED STATES PATENT OFFICE.

MORLEY ALFRED REARE, OF LOS ANGELES, CALIFORNIA.

CHALK-LINE HOLDER.

No. 850,052.  Specification of Letters Patent.  Patented April 9, 1907.

Application filed July 25, 1906. Serial No. 327,601.

*To all whom it may concern:*

Be it known that I, MORLEY ALFRED REARE, a citizen of the United States, and a resident of Los Angeles, in the county of Los Angeles and State of California, have invented a new and Improved Chalk-Line Holder, of which the following is a full, clear, and exact description.

This invention relates to cord-holders such as used in holding marking-cords, such as chalk-lines.

The object of the invention is to produce a device of this kind which is simple in construction and which will operate normally to maintain the cord wound within the device, but which will enable the cord to be drawn out when it is to be used.

A further object of the invention is to provide an arrangement for maintaining a suitable tension in the cord when it is extended and also to construct the parts so as to enable the cord to be relieved of this tension when desired.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures.

Figure 1 is a front elevation of the device with the forward cover thereof removed. Fig. 2 is a cross-section on the line 2 2 of Fig. 1. Fig. 3 is a rear elevation of the device, certain parts being broken away and shown in section substantially on the line 3 3 of Fig. 4. Fig. 4 is a side elevation of the device. Fig. 5 is a section on the line 5 5 of Fig. 3 and illustrating details of devices for locking the reel carrying the cord; and Fig. 6 is a section further illustrating the devices shown in Fig. 5, the same being shown in section on the line 6 6 of Fig. 3.

Referring more particularly to the parts, 1 represents the case of the device, which comprises a substantially cylindrical shallow body or box 2, which is closed at the front by a cover 3 and at the rear by a similar cover or plate 4. Against the inner face of the rear cover 4 I provide a locking-plate 5, which constitutes the side face of a reel 6, the said reel having a face-plate 7 near the cover 3, but separated therefrom by a gear-space 8. This reel 6 is mounted upon a sleeve 9, which is itself disposed around a stud 10, which passes through the covers 3 and 4, as shown. The reel 6 has a cylindrical body 11 of much smaller diameter than the plates 5 and 7, which plates have a diameter which enables them to fit nicely within the body 2, as indicated. The side of the body 2 is provided with a slot 12, which extends longitudinally with respect to the axis of the stud 10, and through this slot the marking-cord 13 may be drawn out, the body of the cord being normally wound upon the reel, as indicated in Figs. 2 and 3.

Rigidly mounted on the sleeve 9 within the gear-space 8 I provide a pinion 14, and at a suitable point on the face-plate 7 a stud 15 is attached, which secures rotatably in position a gear-wheel 16. On a fixed washer 17, held by the bolt 15, a coiled or spiral spring 18 is attached, the outer end of the said spring being attached to the gear-wheel at the point 19, as shown. Upon the end of the cord or line 13 a ring 20 is attached, which is adapted to prevent the end of the cord from passing into the interior of the case and also enables the cord to be readily drawn out. When the cord is drawn out, as suggested, the reel 6 is rotated as the cord unwinds. Referring to Fig. 1, it will be seen that as the reel rotates the gear-wheel 16, which meshes with the pinion 14, will be rotated in a right-hand direction and will have a planetary movement around the pinion. This will have the effect of winding up the spring 18. In this way the cord may be extended, but will be subjected to a tension tending to wind it upon the reel. In order to lock the reel in any desired position so as to relieve the cord of tension, I provide the locking-plate 5 aforesaid with a plurality of small openings 21, which are disposed circumferentially about the pin or stud 10 as a center, and on the inner face of the rear cover I provide a leaf-spring 22, which is fixed at 23, and tends to hold its pointed extremity against the locking-wheel in alinement with the openings 21.

The spring 22 is attached between two parallel slits 25 in the cover 4, which extend longitudinally of the spring and operate as guides for a slidable sleeve 26. This sleeve holds the spring close against the inner face of the cover in the manner illustrated in Fig. 6. The end of the spring normally is in engagement with one of the openings 21, which locks the reel against rotation. By sliding the sleeve toward the free end of the spring the sleeve will withdraw the point of the spring from the opening, so as to release the reel, as will be readily understood. The sleeve is simply formed of a strip of light metal, the ends of which are thrust through the slits and crimped under the spring, as indicated. On the outer side of the sleeve a knob 24 is attached, which may be pressed by one's thumb to slide the sleeve.

In order to counterbalance the reel, I provide the same with a counterweight 27, disposed opposite to the gear-wheel 16, as indicated in Figs. 1 and 2.

Having thus described my invention, I claim as new and desire to secure by Letters Patent—

1. A cord-holder comprising a case having a slot therein, a reel rotatably mounted within said case and adapted to have a cord wound thereupon and passing out through said slot, a fixed pinion mounted within said case, a gear-wheel carried by said reel meshing with said pinion and having a planetary movement with respect to said pinion, and a spring having one end attached to said gear-wheel and one end fixed with respect to said reel, whereby said spring will be wound when said cord is extended.

2. A cord-holder comprising a case having a slot therein, a reel rotatably mounted within said case and adapted to have a cord wound thereupon and passing out through said slot, a fixed pinion mounted within said case, a gear-wheel carried by said reel meshing with said pinion and having a planetary move ment with respect to said pinion, a spring having one end attached to said gear-wheel and one end fixed with respect to said reel, whereby said spring will be wound when said cord is extended, and means for locking said reel against rotation.

3. In a cord-holder, in combination, a case, a reel rotatably mounted therein and having a locking-plate presenting a plurality of openings disposed circumferentially with respect to the axis of rotation of said reel, a fixed pinion mounted on said case, a gear-wheel rotatably mounted on said reel and meshing with said pinion, a spring having one end fixed with respect to said reel and one end attached to said gear-wheel, whereby the rotation of said reel will wind said spring, a leaf-spring attached to said case and adapted to project into any of said openings to lock said reel against rotation, and a sliding sleeve running on said spring and affording means for disengaging the same from said reel.

4. In a cord-holder, in combination, a case, a reel rotatably mounted therein, a spring mounted on said case and tending to touch the face of said reel, and a sleeve guided on said case, sliding on said spring and affording means for disengaging said spring from said reel.

In testimony whereof I have signed my name to this specification in the presence of two subscribing witnesses.

MORLEY ALFRED REARE.

Witnesses:
  MAYNARD McCLAY,
  CHARLES H. COTTER.